United States Patent [19]

Sullivan

[11] Patent Number: 5,471,216
[45] Date of Patent: Nov. 28, 1995

[54] ASSOCIATIVE PROCESSOR FOR DETECTING REDUNDANT RADAR DATA AND METHOD OF USE THEREOF

[75] Inventor: William B. Sullivan, Verona, N.J.

[73] Assignee: Wide Band Systems, Inc., Franklin, N.J.

[21] Appl. No.: 165,246

[22] Filed: Dec. 10, 1993

[51] Int. Cl.⁶ ........................................ G06F 7/04
[52] U.S. Cl. ............................. 342/195; 375/242
[58] Field of Search ................. 342/195, 44, 37, 342/32; 340/870.01; 235/375, 435; 375/25, 75

[56] References Cited

U.S. PATENT DOCUMENTS 5,055,659  10/1991  Hendrick et al. ................... 342/44
5,270,705  12/1993  Duffy ................................. 392/195

*Primary Examiner*—Mark Hellner
*Attorney, Agent, or Firm*—Z. T. Wobensmith, III

[57] ABSTRACT

A circuit arrangement and a method of use thereof are disclosed both for processing a serial stream of randomly occurring digital words to detect exact or similar words relative to digital words previously received. The circuit arrangement eliminates the unnecessary burden of a radar system from processing data normally caused by the reflection of an RF signal from a physical object. The circuit arrangement comprises means for truncating each received digital word to a predetermined most significant bit (MSB) resolution by dropping at least one least significant bit (LSB) at the right end of the received word. The truncated word serves as an exact word reference. The circuit arrangement further has means for examining the dropped least significant bit (LSB) and if it is a "logic 1", adding a "logic 1" to the truncated received digital word, and conversely, if it is a logic "0", subtracting "1" from the truncated word. The addition and subtraction forming a similar word reference. The circuit arrangement further comprises first means for receiving, holding and comparing the similar word reference against a previously received similar word reference and generating a first output signal if there is a difference therebetween. A second means is provided for receiving, holding and comparing the exact word reference against a previous exact word reference and generating a second output signal if there is a difference therebetween. The circuit arrangement further comprises OR circuit means which receives the first and second output signals and generates a third output signal in the presence of either the first or second output signal so as to notify an external circuit that a redundant measured RF frequency signal has been received, thereby, eliminating any unnecessary processing of such a redundant signal.

19 Claims, 4 Drawing Sheets

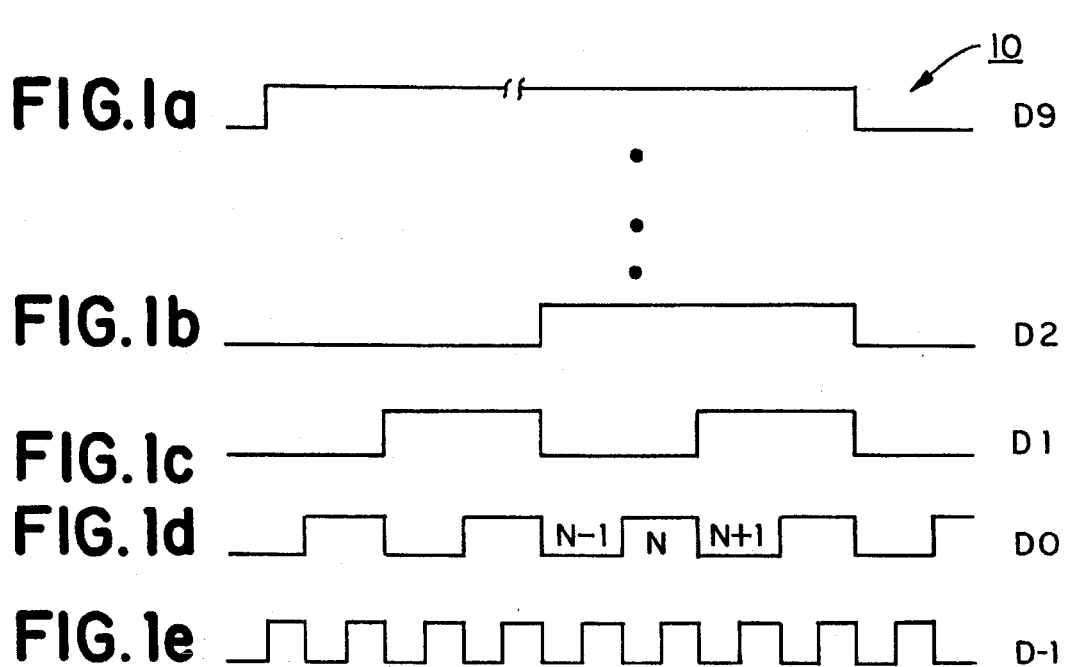
FIG.1a D9
FIG.1b D2
FIG.1c D1
FIG.1d D0
FIG.1e D-1
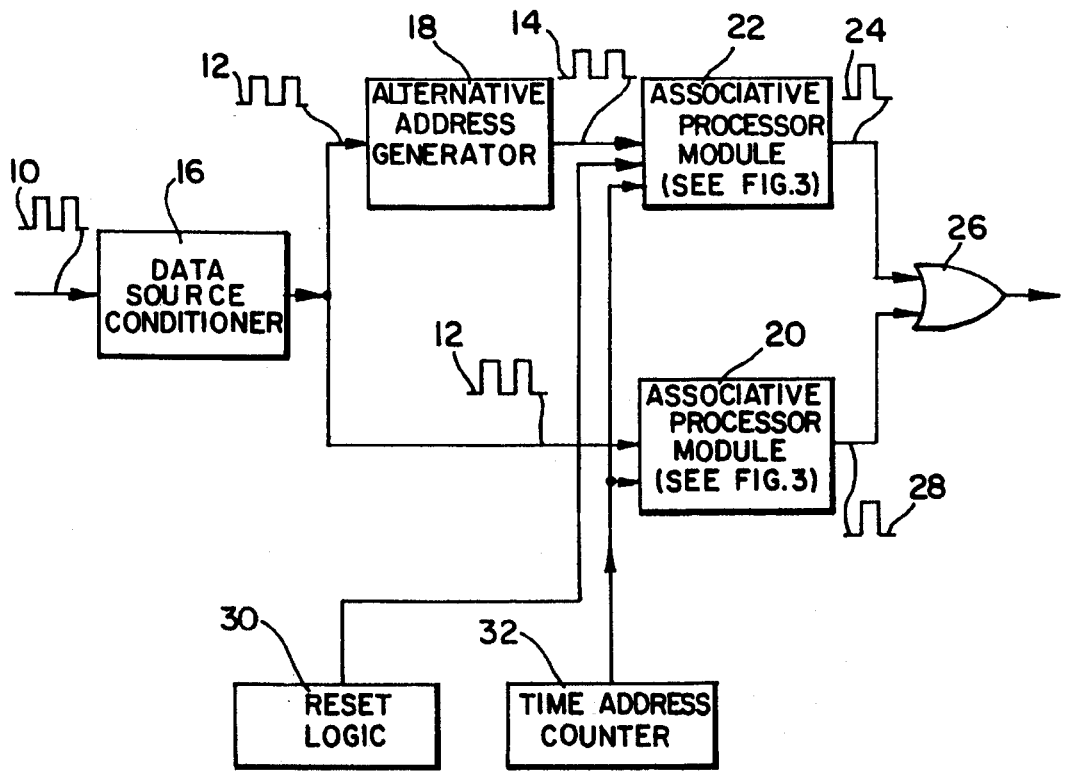
FIG. 2

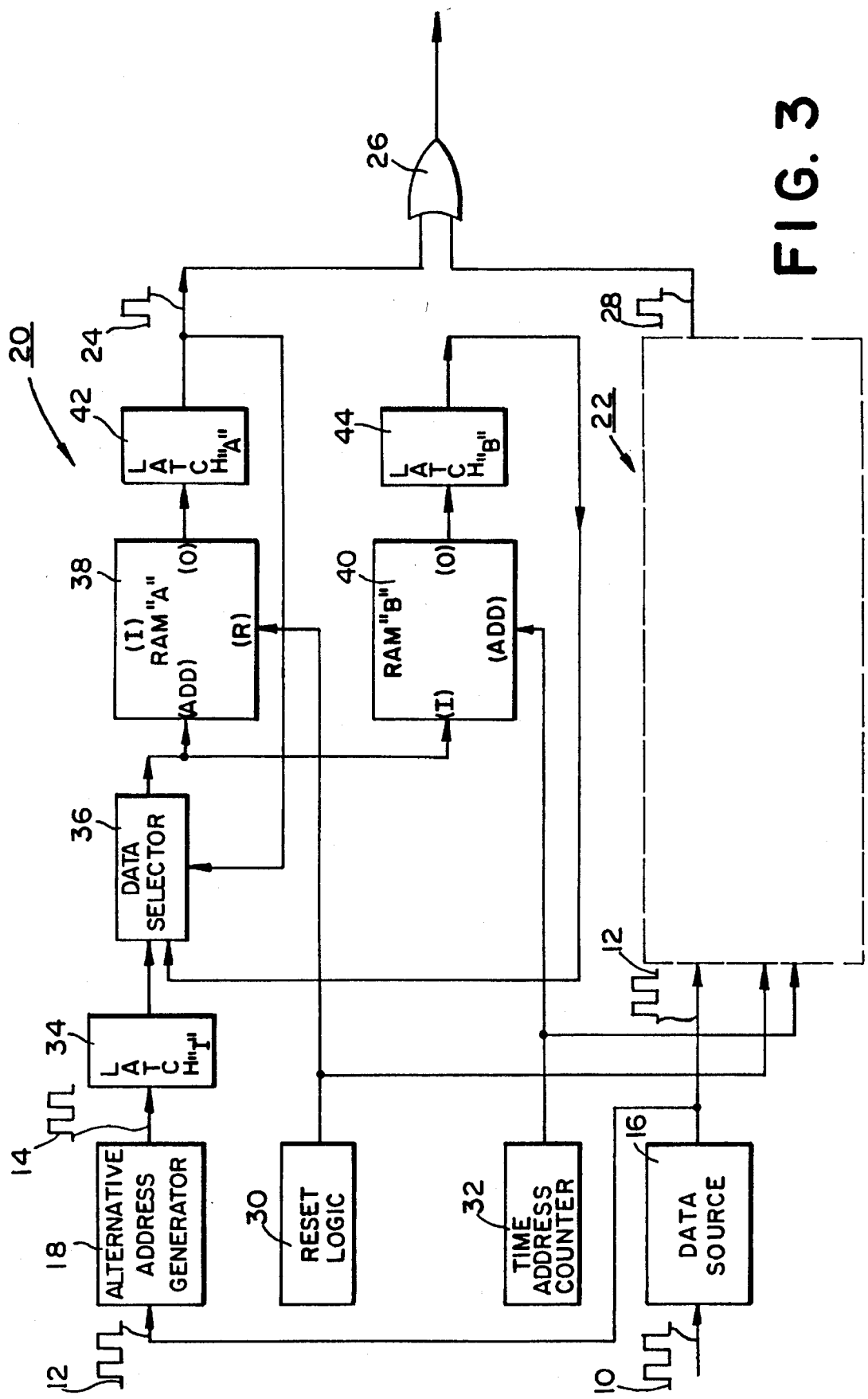

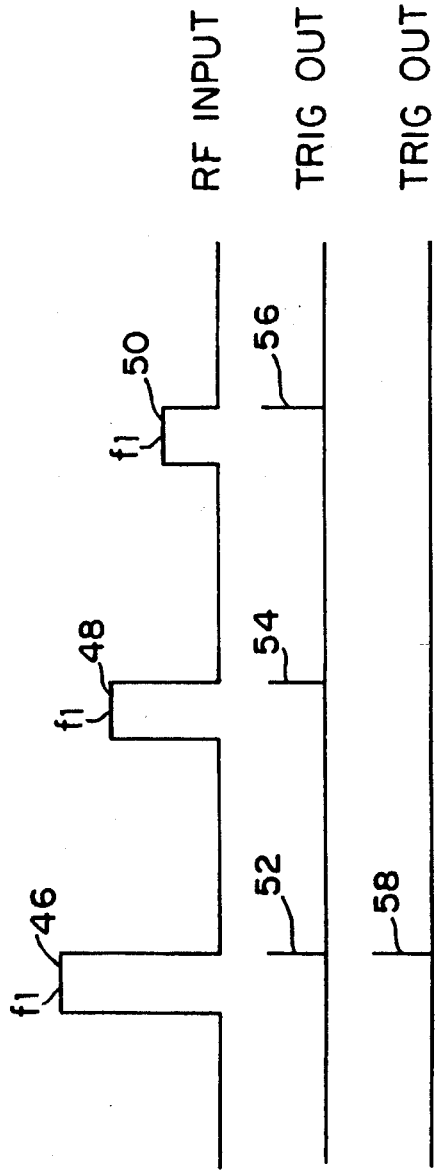
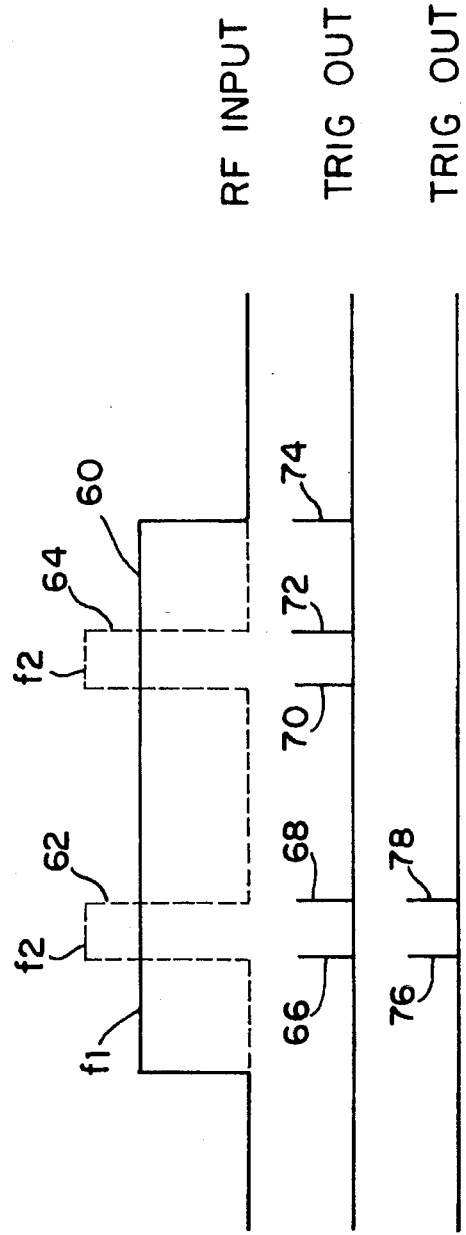

ASSOCIATIVE PROCESSOR FOR DETECTING REDUNDANT RADAR DATA AND METHOD OF USE THEREOF

FIELD OF THE INVENTION

The present invention relates to a circuit arrangement for detecting redundant digital words being received by a radar system. More particularly, the present invention relates to an associative processor, located at the input stage of the radar system, that detects whether the presently received digital word has been previously processed so as to avoid erroneous processing of digital words that were most likely created by the reflection of the signal from a physical object which was associated with a previous word. Specifically, the present invention relates to an associative processor that establishes an exact word reference and a similar word reference and compares such references against the received data so as to eliminate the processing of erroneously received radar information.

BACKGROUND OF THE INVENTION

In the real time processing of digital data, the problem of determining whether or not the current digital data has been previously observed and processed, is often encountered. For example, if a radio receiver, used for a radar system, is being employed to observe and identify various radar transmitters, it is often the case that a radar pulse that is first received is often followed soon thereafter by a second pulse, which was originated by the reflection of the first pulse from some physical object. It is useful to identify the second pulse as a reflection of the first pulse, so as to avoid redundant and erroneous processing thereof. If such is accomplished, a substantial reduction in the receiver's suppression of duplicate data reports is realized. Normally, the radar system comprises a host system digital processor, which analyzes the received digital output, and is relatively busy because of its sorting and correlating of received signals from the transmitting source for identification purposes. If the receiver is also generating redundant reports, which do not correspond to actual signal activity, the host system digital processor is unnecessarily burdened, and may not even be capable of performing its needed sorting and correlating operations.

The common technique for identifying a second pulse as being a reflection of a first pulse, is to measure the RF frequency of the first pulse, and then look for the same RF frequency measurement within a group of near term or subsequent pulses. There are, however, errors present in the measurement of the RF frequency and therefore, the reflected pulse may exhibit a similar, but not necessarily identical, RF frequency measurement. Furthermore, there may be more than one reflective pulse, so that the process of measuring the RF frequency has to consider multiple events. Because of the speed or response time of the radio receiver and because of the fact that there may well be multiple radar transmitters being simultaneously observed by the radio receiver, reflective pulses may not even be contiguous with the first pulse, but rather, there may be many intervening unrelated pulses received that may also have associated reflective signals and all of which require the same RF frequency measurement identification process. This measurement identification process may be unable to handle all such possibilities.

Prior art devices and techniques have addressed the redundant digital data problem by primarily using an exact match technique, whereby the current digital data is compared exactly to the previous data to provide identification therebetween. Whereas these exact comparisons yielded proper results, they did not provide the solution for detecting similar data. The detection of similar data usually required the employment of relatively complicated software techniques that demanded relatively long processing times to yield adequate results. Further, attempts have been made to assert similarity between data by a simple truncation method for handling the data. For example, if the measured data exhibits a 12 bit resolution but an accuracy of 10 bits is only needed, then a comparison is made only on the 10 most significant bits (MSB's). Such a comparison does not always yield adequate results. In particular, consider the following 10 bit digital data word: 01 1111 1111, and then compare it to the next adjacent word that is increased by one (1) bit: 10 0000 0000. A comparison between the first 10 bit digital word and the second 10 bit digital word reveals that requiring an exact comparison, even on the reduced (10 bits) resolution, fails to associate a 1 bit difference therebetween and, therefore, this technique fails to detect similarity between data words. It is desired that means be provided to not only detect exact data between previous and currently received digital data words, but also detect similar data between previous and presently received digital data words.

It is, therefore, a primary object of the present invention to provide for a circuit arrangement for associating two digital words occurring randomly in a serial stream of digital words and determine if any one thereof is a similar or exact word, relative to previously received digital words, so as to avoid the erroneous processing of the exact and similar words.

It is a further object of the present invention to provide a method for detecting redundant exact or similar words occurring between two digital words that are randomly present in a serial stream of digital words.

It is a still further object of the present invention to provide a circuit arrangement, as well as a method of use thereof, for determining redundant, exact and similar words received by a radio receiver used within a radar system and having both multi-path blanking and leading edge trigger modes of operation.

It is another object of the present invention to provide a circuit arrangement and a method of use thereof that are easily altered so as to accommodate different parameters of a radar system.

Other objects of the present invention, as well as the advantages thereof over existing and prior art forms, which will be apparent in view of the following detailed description, are accomplished by the means hereinafter described and claimed.

SUMMARY OF THE INVENTION

The present invention is directed to a circuit arrangement and a method of use thereof for processing a serial stream of received digital words to determine if any exact or similar word thereof has been previously detected so to eliminate unnecessary processing thereof.

The circuit arrangement receives and processes a serial stream of randomly occurring digital words that are representative by logic "1's" and "0's" to determine if any are exact or similar words that have been previously detected. Each of the words represents a radar identification code. The circuit arrangement truncates the received digital word to a predetermined most significant bit (MSB) resolution by dropping at least one least significant digit at the right end of the received word. The truncated word serves as an exact word reference. The circuit arrangement has means for examining the dropped least significant bit and if this bit is a "1" adds a "1" to the truncated digital word and, conversely, if the least significant bit is a "0" subtracts a logic "1" from the truncated word. The added or subtracted bit to or from the truncated digital word forms a similar word reference. The circuit arrangement further comprises first means for receiving, holding and comparing the similar word reference against a previous similar word reference and providing a first output therefrom if there is a difference therebetween. The current arrangement further comprises second means for receiving, holding and comparing the exact word reference against a previous exact word reference and providing a second output signal therefrom if there is any difference therebetween. The circuit arrangement further comprises an OR circuit means for receiving the first and second output signals and providing a third output signal in the presence of either the first or second output signals and which represents that the exact or same radar identification code presently being received has previously been received and processed by the circuit arrangement. Such detection frees a radar system from unnecessary processing of redundant data.

The present invention also provides for a method of processing a serial stream of randomly occurring digital words to determine if each of the words is exact or similar to words that have been previously processed.

BRIEF DESCRIPTION OF THE DRAWINGS

For the purpose of illustrating the invention, there is shown in the drawings forms which are presently preferred if being understood, however, that the invention is not limited to the precise arrangements and instrumentality shown.

FIG. 1 is composed of FIGS. 1(a), 1(b), 1(c), 1(d), and 1(e), each illustrating a portion of the information representing both the exact word reference and similar word reference of the present invention.

FIG. 2 is a block diagram showing the essential elements of the present invention.

FIG. 3 primarily illustrates the block diagram arrangement of the associative processing modules of FIG. 2.

FIG. 4 is composed of FIGS. 4(a), 4(b) and 4(c), the composite of which illustrates the benefits of the present invention of eliminating the redundant processing associated with the multi-path blanking mode of operation of a radar system.

FIG. 5 is composed of FIGS. 5(a), 5(b) and 5(c), the composite of which illustrates the benefits of the present invention of eliminating redundant processing associated with the leading edge trigger mode of operation of a radar system.

DETAILED DESCRIPTION OF THE PREFERRED EMBODIMENTS

Figure 6:
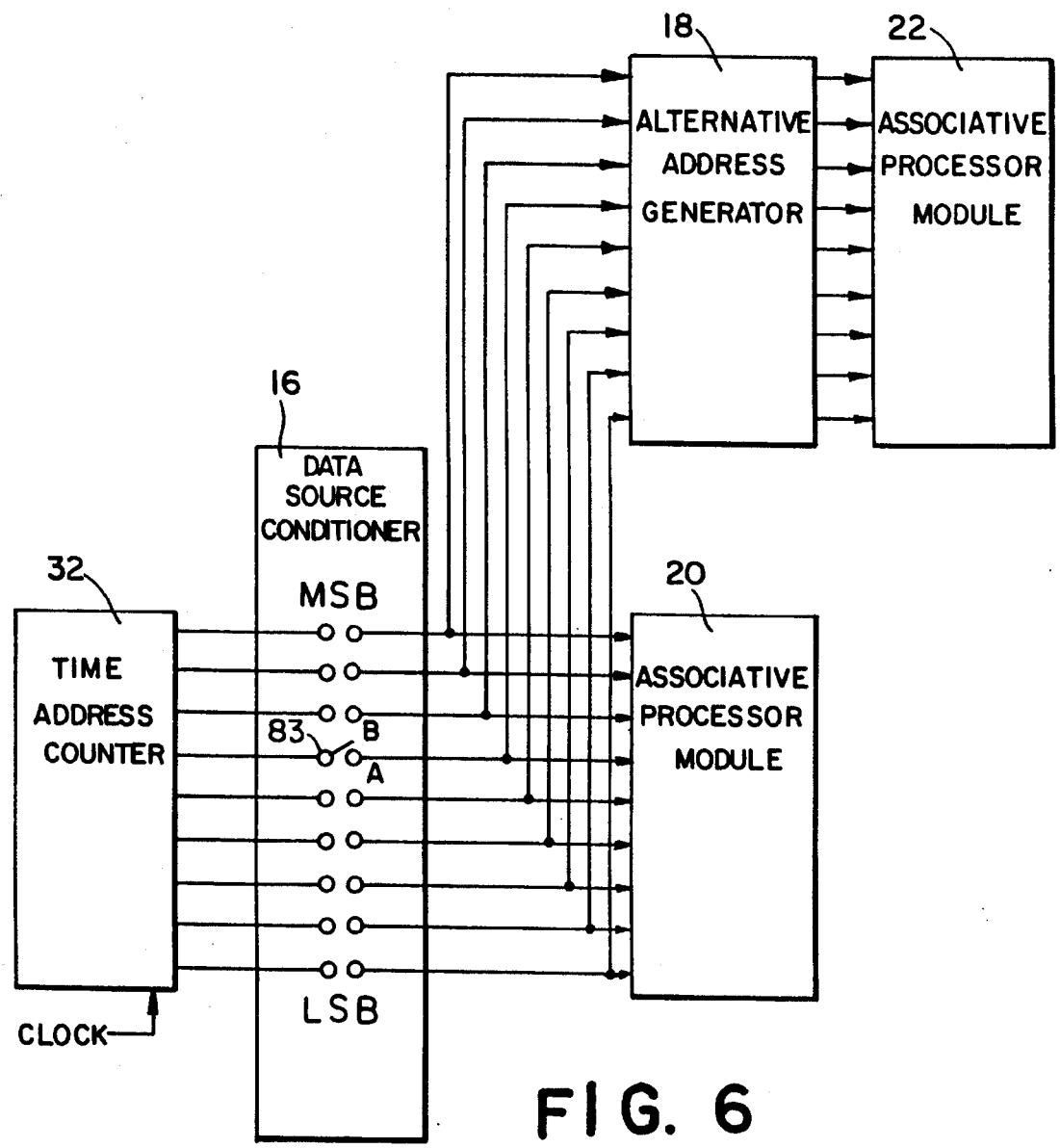
FIG. 6 is a block diagram illustrating the operation of the time address counter of FIGS. 2 and 3.

The following detailed description is the best presently contemplated mode of carrying out the present invention. However, the description is not intended in any limiting sense, but is made solely for the purpose of illustrating the general principles of the invention.

Referring to the drawings, wherein like reference numbers indicate like elements throughout, there is shown in FIG. 1 a digital word 10 represented by logic "1's" and "0's" which is but one word of a serial stream of randomly occurring digital words. Each of the randomly occurring words represents a measured RF frequency corresponding to a radar identification code. The present invention examines the digital word 10 presently being received and determines if it had been previously received and/or processed so as to eliminate redundant processing typically occurring when a second word is received that was originated by the reflection of a first or previous word from some physical object.

In general, a sequence of digital data words are received by the circuit arrangement of the present invention which is particularly suited to be used in a radar system. Each data word is, for example, comprised of 12 binary bits and it is desired to provide such data with a resolution of 10 binary bits, or, 0.1%. The present invention, in its operation, first truncates each received digital word to a predetermined most significant bit (MSB) numeric representation having, for example, 10 most significant bits. The truncated word (10 bits) is used to form the exact and similar word references which may be further described with reference to FIG. 2.

FIG. 2 is a block diagram illustrating the present invention as it may be used in a radio receiver for a radar system (not shown). As shown in FIG. 2, the digital word 10 is received by the data source conditioner 16 which performs the truncation of the digital word to its 10 most significant bits so as to form an exact reference 12 which is routed to an alternate addressed generator 18 and to an associative processor module 20. The alternate address generator 18 may comprise three 54F283 logic elements of National and its operation may be described with reference to FIG. 1.

FIG. 1 is composed of FIGS. 1(a), 1(b), 1(c) and 1(d) that respectively identified the D0 (bit 0), D1 (bit 1), D2 (bit 2) and . . . D9 (bit 9) which composed the ten bit truncated word serving as an exact word reference 12. FIG. 1(e) shows the lower most eleventh bit or, more generally, the next finer resolution bit D−1 of the original 12 bit received word and is shown in FIG. 1(e) as being a logic (1), but in actuality it may very well be a logic "0". FIG. 1(d) shows the D0 data as having a central cell N and next lower cell of N−1 and next higher cell of N+1. If the eleventh bit D−1 is a logic "1", then the N+1 cell represents the D0 data and conversely, if the eleventh bit D−1 is a logic "0", then the N−1 cell represents the D0 data. This representation may be further described with reference to actual values. For example, if the exact word reference 12, i.e. the truncated digital word represented by FIGS. 1(a), 1(b), 1(c) and 1(d), has a digital value of 100 and the examination of the 11 bit (D−1) reveals that it is a logic "1", then a value of " 1" is added to the 100 value to form a similar word reference 14 of 101. Conversely, if the 11 bit (D−1) is a logic "0", then a value of 1 would be subtracted and the similar word reference 14 would have a value of 99. The alternate address generator 18 examines the eleventh bit (D− 1) and if it is a "1" adds a binary 1 to form the similar word reference 14 and conversely, if it is a "0", subtracts one in its forming of the similar word reference 14.

Again with reference to FIG. 2, the digital word 10 is received by a data source conditioner 16 which performs the 10 bit truncation so as to form the exact word reference 12. The exact word reference 12 is routed to both the alternative address generator 18 and an associative processor module 20. The alternative address generator 18 generates the similar word reference 14 which is routed to an associative processor module 22.

In general, the associative processor module 22 provides a means for receiving and holding the similar word reference 12 and providing a first output digital word therefrom. The associative processor 22 further comprises means for receiving the first digital output word and comparing the presently received and held similar word reference 14 against a previously received and held similar word reference 14 and generating an output signal 24 if there is a difference therebetween, which output is routed to OR circuit means 26 that may be of the type 54F32 of National. The associative processor module 20 has the same provisions as the associative module 22, but receives the exact word reference 12 and develops an output signal 28 if the present exact word reference 12 is different from the previous exact word reference 12. The associative processor modules 20 and 22 each receive control signals from reset logic 30 and time address counter 32.

As will be further described hereinafter, the reset logic 30 provides an initialization function for the associative processor modules 20 and 22 while they are being used in a multi-path blanking mode of operation of a radar system. The time address counter 32 is a clocked free-running type and may comprise three 54F163 logic elements of National. The time address counter 32 provides a time interval parameter which is used by each of the associative processor modules 20 and 22 and which modules may be further described with reference FIG. 3.

The modules 20 and 22 of FIG. 3 provide associative storage in which locations are identified by contents rather than by specific addresses. FIG. 3 illustrates an arrangement of logic elements generally identified as associative processor module 20, but such an arrangement is also applicable to associative processor module 22 (generally shown in phantom). The modules 20 and 22 each comprise a plurality of elements which reference numbers, typical type, quantity and supplier is shown in Table 1.

TABLE 1

| Reference No. | Element | Type, Amount, Typical Supplier |
| --- | --- | --- |
| 34 | Latch "I" | 54F374, 2 each, National |
| 36 | Data Selector | 54F157, 3 each, National |
| 38 | RAM "A" | CY7C150, 1 each, Cypress |
| 40 | RAM "B" | CY7C172A, 3 each, Cypress |
| 42 | Latch "A" | 54F74, 1 each, National |
| 44 | Latch "B" | 54F174, 2 each, National |

The input latch 34 is serially arranged with a data selector 36 which steers or controls informational flow to RAM "A" 38 and RAM "B" 40. The output of the data selector 36 is routed to the parallel arranged RAMs 38 and 40. Each of the RAMs 38 and 40 has address (ADD), input (I), and output (O) ports and RAM 38 further comprises a reset (R) input. The output of the data selector 36 is routed to the address port of RAM 38 and to the input port of RAM 40. The RAM 40 has its address port connected to the time address counter 32. The output ports of RAMs 38 and 40 are respectively routed to latches 42 and 44. The output of latches 42 and 44 are routed to the data selector 36. However, no information is supplied to the data selector 36 from latches 42 and 44, unless the respective output content of latches 42 and 44 comprises a logic "0." The output of latch 42 also provides the output signal 24, previously discussed with reference to FIG. 2, which is routed to one input of OR circuit 26.

The operation of the associative process modules 20 and 22 may be described with reference to a discussion of module 22 handling of the similar word reference 14 and with the understanding that the discussion thereby given is equally applicable to the associative module 20 handling of the exact word reference 12. Initially, the contents of RAM "A" 38 is cleared to a "0" state. The similar reference word 14, comprising ten (10) bits, is applied to the input latch 34. Separately and simultaneously, the exact word reference 12 is applied to the processor 22 also having an input latch (not shown). The input latch 34 of module 20 passes the 10 bit similar word reference 14 to the data selector 36 which, in turn, passes the 10 bit similar word reference 14 to the address port of RAM "A" 38 which, in turn, accesses the data at the location specified by the similar word reference 14. The data in RAM "A" at the 10 bit address consists of a single bit which may be either a "0" or a "1." If the presently received similar word reference 14 is a new data word, not previously seen, then the bit is "0" and conversely, if the bit is "1" then the similar word reference 14 has been received before.

Assuming that the case is that the similar word reference 14 is new data and a "0" is present, then RAM "A" 38 causes latch "A" 42 to generate a "0" output, and the "0" output from latch "A" 42 is used to enable the data selector 36, causing the similar word reference 14 to be presented to both the address input of RAM "A" and to the input port of RAM "B" 40. RAM "A" will now select a "1" at its input port, causing the "0", which was previously present, to be replaced by a "1". Simultaneously, the contents of RAM "B" 40 is loaded, by way of its input port, with the similar word reference 14. The original contents of RAM "B" were loaded into latch "B" 44 at the beginning of the sequence so that the original contents were used to address RAM "A" causing a "0" to be written into RAM "A" at the address specified by the original contents of RAM "B."

Assuming now that the contents of latch "A" is "1 " because the initially addressed 10 bit similar word reference 14 was previously received. More particularly, the initially (present) addressed ten (10) bit similar word reference 14 is the same as the prior (previous) similar word reference 14. The "1" from latch "A" of the module 20 along with the output of latch "A" of the associative processor module 22 is routed to the OR circuit 26 and if either output is a "1" then the data has been previously observed and, therefore, the subsequent logic (not shown) of the radar system is instructed to disregard this presently received data. Because two associative processor modules 20 and 22 are addressed and respond simultaneously, it is not necessary for the present digital data to be identical to the previous data to generate this disregard instruction, in that the "similar" characteristic of the alternate address generator 18 provides the similar word reference 14 which assures that the adjacent reference data, under the control of the address generator 18, is correctly identified. It should be noted that in the case of digital data which slowly varies linearly, associative processors 20 and 22 continue to capture adjacent data and the correct response is still obtained in spite of the slowly changing data.

Each of the associative processor modules 20 and 22 has two basic modes when operating within a radar pulse receiver. The first mode is that of a multi-path blanking and the second mode is that of a leading edge trigger. When operating as a multi-path blanking, the exact word reference 12 (set by a truncation of the digital input data 10) is set to the accuracy of the RF frequency measurement of the received digital input data. The time address counter 32 is set to the maximum anticipated multi-path blanking time cycle which is approximately 20 microseconds. Each of the associative processors 20 and 22 operates continuously, allowing the radar pulse receiver to output data whenever the measured RF frequency is either the same, or similar to, the RF frequency measurements which have occurred within the previous 20 microseconds.

Determination of the time between first detecting and encoding an input data word and erasing that same data is determined by the updating period of the time address counter 32. The time address counter 32 increments, typically once every 75 nanoseconds (ns), and no more than one new address can be introduced, every 75 ns, by counter 32 into either associative processor 20 or 22. The time address counter 32 has a typical fixed length of 12 bits, requiring 307.2 microseconds to complete a count sequence or cycle time.

In normal operation, each of the associative processor modules 20 and 22, operating in a multi-path blanking mode, periodically loads the contents of RAM "B" using that data to erase data from RAM "A." When data is presented to the circuit, shown in FIG. 3, the contents of RAM "A" are checked to determine whether this is new data; and if it is new data, the RAM "A" location is set to "1" and the data word is loaded into RAM "B" to reappear at a predetermined later time (cycle time) to erase RAM "A." If the data has been previously observed, RAM "A" responds with a " 1" and nothing is loaded into RAM "B."

In the multi-path blanking mode, in one embodiment, a receiver responsive to a 40 MHz clock, processes data every 25 microseconds. Each of the associative processor modules 20 and 22 operates on three, 25 nanosecond clock steps, wherein the first step reads the input data (similar word reference 14 and exact word reference 12, respectively) to RAM "A" address port and then steps the time address counter 32. In step 2, the contents (1 bit) of RAM "A" is loaded into latch "A" and, the contents "10 bits" (previous reference 14 or 12) of RAM "B" is loaded into latch "B" and if latch "A" is "0" the input data will be loaded into the input port of RAM "B" and, finally, the RAM "A" will write a "1 " at the input data address. In step 3 the RAM "A" will have a "0 " written at the address specified by the contents of latch "B". It should be noted that in these three process steps, the time address counter 32 is incremented only once. The benefits of the present invention related to the multi-path blanking mode may be further described with reference to FIG. 4.

FIG. 4 is composed of FIGS. 4(a), 4(b), and 4(c) in which FIG. 4(a) illustrates the receipt of an RF pulse 46 at a RF frequency f1 followed by a sequence of multi-path reflective signals 48 and 50, all at or near the RF frequency f1. It should be noted that although pulses are shown in FIG. 4, in the practice of this invention, these pulses comprise digital data made up of multiple, e.g. 10, bits. FIG. 4(b) shows the operation of a prior art receiver not having the benefits of the present invention. More particularly, FIG. 4(b) shows that the prior art receiver trigger pulses 52, 54 and 56 are respectively generated for each of the received pulses 46, 48, and 50. However, as is shown in FIG. 4(c), the associative processors 20 and 22 of the present invention operate to suppress the receiver output, except for the first received pulse 46, to generate only one correct trigger output 58. The trigger output 58 is generated without affecting the proper receiver's response to other signals at different RF frequencies being received by the radar system related to the present invention.

The second mode of operation for the associative processors 20 and 22 is that of the leading edge trigger. In the leading edge trigger mode, RAM "B" is not employed; otherwise, the operation of the associative processor modules 20 and 22 is as before (multi-path mode), with RAM "A" being initially read to determine whether the present data is new data, and if it is new a "0" is outputed to the "OR" circuit 26 and then RAM "A" is written to "1". If the data has been previously observed, a "1" is outputed to the "OR" circuit 26 and no further action is taken. Since there is no time limit to RAM "A" in the leading edge trigger mode the reset input from the reset logic of FIGS. 2 and 3, is used to clear RAM "A" whenever an external circuit determines that the signal being measured is no longer present.

The leading edge trigger mode, in effect, prevents the receiver from repetitively processing the same data whenever an input signal is present, in contrast to the multi-path blanking mode of operation that prevents the processing of data whenever it is repetitive within the predetermined time interval established by the time address counter 32. Accordingly, if desired, the time address counter 32 could be eliminated during the leading edge trigger mode of operation in favor of an external threshold device. Whereas such elimination is possible, it is preferred that the time address counter 32 establish a time period set to the system definition of a continuous wave (CW) signal application. For this application, the time address counter 32 allows a CW signal to be automatically processed every interval corresponding to the CW definition. For example, a typical CW definition is 100 microseconds; i.e., any signal with a duration longer than 100 microseconds is normally defined to be CW. When the time address counter is set to 100 microsecond, the receiver automatically allows the processing of the CW signal once for 100 microseconds, thereby, allowing a host computer in the radar system to update its corresponding CW signal at a slower rate. The operation of the leading edge trigger mode as well as the benefits of the present invention may be further described with reference to FIG. 5.

FIG. 5 is composed of FIGS. 5(a), 5(b), and 5(c), wherein FIG. 5(a) illustrates a so called "long pulse" 60, at an RF frequency f1 being received by a radar receiver along with multiple so called "short pulses" 62 and 64 each being of a RF Frequency f2. The power level of the short pulses 62 and 64 is assumed to be higher than the long pulse 60, thereby allowing the receiver to make accurate frequency measurements on the shorter pulses 62 and 64 in the presence of the long pulse 60. As shown in FIG. 5(b), a radar receiver not having the benefits of the present invention, not only triggers (66 and 68) on the first pulse 62 for frequency f2, but also triggers (70 and 72) on the second pulse 64 for frequency f2, as well as triggers (74) on the trailing edge of the pulse 60 for frequency f1. However, as shown in FIG. 5(c), a radar receiver having the benefits of the associative processor modules 20 and 22 suppresses all erroneous data and only produces the correct triggers 76 and 78 for the pulse 62 of the frequency f2. The operation of the time address counter 32, which is disabled in the leading edge mode of operation shown in FIG. 5, may be further described with reference to FIG. 6.

The time address counter 32, shown in FIG. 6, is a multibit counter, typically employing 12 or 16 bits per operating cycle. The effective cycle time of a time address counter 32 is accomplished by the selection of the number of least significant bits (LSB's) which are provided to the alternate address generator 18 and the associative processor 20 by means of the data source conditioner of 16, as is to be further described with reference to FIG. 7. By reducing the number of least significant bits provided to RAM "B" in both of the associative processors 20 and 22, while keeping a constant clock rate, the apparent period of the time address counter 32 is reduced. The "apparent period" is meant to correspond to the time period in which the same address at the output of the time address counter 32 is repeated. When this time period is reduced, and the receiver is operating in the multi-path blanking mode, the multi-path blanking sequence accepts a shorter definition for its multi-path range; i.e., the time for the multi-path range to complete its path. For example, typical time periods for ship board multi-path sequences extend from about 5 to 10 microseconds and the time address counter is set so that its time period exceeds 10 microseconds. On the other hand, it is known that Pulse Doppler radar signals have a high duty cycle with pulse repetition intervals of 10 to 20 microseconds; and, in general, it is not desired to ignore a Pulse Doppler radar requirement even to satisfy a desire to blank multi-path. The time setting for the time address counter 32, in this situation, might be 8 microseconds which is long enough to correctly process most multi-path sequences, but short enough to assure correct processing of the Pulse Doppler radar operations.

Referring to FIG. 6, if the most significant bit (MSB) of the time address counter 32 is disconnected from the associative processor modules 20 and 22, by way of the data source conditioner 16, then the apparent period of the counter is halved. Similarly, disconnecting two most significant bits (MSB) reduces (divides) the apparent period by a factor of four (4). Taken to its limit, if only the least significant bit (LSB) of the time address counter were connected to the associative processor modules 20 and 22, by way of the data source conditioner 16, the time address counter 32 would appear, to the associative processor modules 20 and 22, to have the same address request every sequence, or every 150 nanosecond time period. Therefore, by selecting which of the most significant bits (MSB) of the time address counter 32 are disconnected, the time interval at which the associative processor modules are serviced in the multi-path blanking mode is adjusted. The operation of the time address counter 32 may be further described with reference to FIG. 7

Figure 7:
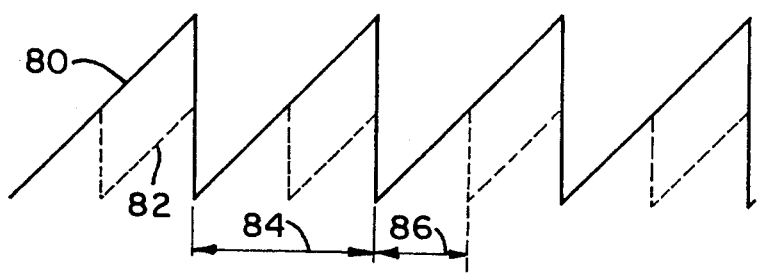
FIG. 7 illustrates the variable time interval associated with the time address counter.

FIG. 7 illustrates two sawtooth waveforms 80 and 82 (shown in phantom) having respective time periods 84 and 86 (partially shown in phantom). The operation of time address counter 32 may be further described with simultaneous reference to both FIGS. 6 and 7. Assuming the switch, plug or jumper 88 of the data source conditioner 16 of FIG. 6, shown as located at the sixth LSB up from the bottom, is set to the "A" position, then the counter period corresponds to the period 84 related to sawtooth 80 of FIG. 7. If the switch is now moved to the shown "B" position, even though the counter rate of the time addresses counter 32 has not been changed, the period 84 is halved and corresponds to the period 86 that is related to the sawtooth 82. In other words, the counter appears to the associative processor modules 20 and 22 to generate the same RAM "B" address twice as often. The RAM "B" addresses which correspond to the unselected address lines (those schematically illustrated as being the open contacts of the jumpers of data source conditioner 16) of the time address counter 32 are never accessed. In this manner, the time interval selected for the multi-path blanking mode of operation is selected by a jumper 88 and may easily range from 75 nanoseconds to over 300 microseconds.

It should now be appreciated that the practice of the present invention provides a time address counter 32 having a time interval for the operation of the associative processor modules 20 and 22 that is easily adjusted, and that provides the needs for the associative processor modules 20 and 22 to operate in the multi-path blanking and leading trigger edge modes of operations of the radar system, while also taking into account the processing requirements of a continuous wave (CW) signal.

It should be further appreciated that the practice of the present invention provides for an exact word reference 12 and a similar word reference 14 each of which cooperates with its respective associative processor modules 20 and 22 so as to detect, over a selectable time period, any randomly occurring digital words in a stream of data that are redundant and repetitive. Detection of the redundant digital word eliminates the burden of the radar system from handling the unnecessary tasks of processing redundant radio frequency radar signals.

It should now be appreciated that the present invention not only teaches the use of exact and similar word references to accurately detect redundant data, but also teaches the benefits of the use of digital techniques for other applications. It should be further appreciated that the practice of the present invention provides a method and circuit arrangement for associating two digital words, occurring randomly in a serial stream of digital words, and identifying such words as being exact or similar words within a selectable time interval that may be simply and independently programmable.

I claim:

1. A circuit arrangement for processing a serial stream of randomly received digital words represented by logic "1's" and "0's" and combinations thereof to determine if each word is an exact or similar word as those previously received, said circuit arrangement comprising:
   (a) circuit means for truncating each received word to a predetermined most significant bit (MSB) resolution by dropping at least one least significant bit (LSB) at the right end of the received word, said truncated word serving as an exact word reference;
   (b) circuit means for examining the dropped least significant bit and if it is a "1" then adding " 1" to the truncated word and, conversely, if the least significant bit is a "0 ", then subtracting a "1" from said truncated word, said adding or subtracting forming a similar word reference;
   (c) first circuit means for receiving, holding and comparing said similar word reference against a previous similar word reference and generating a first output signal if there is a difference therebetween;
   (d) second circuit means for receiving, holding and comparing said exact word reference against a previous exact word reference and generating a second output signal if there is a difference therebetween.

2. A circuit arrangement according to claim 1 further comprising circuit means for receiving said first and second output signals and generating a third output signal in the presence of either said first and second output signals.

3. A circuit arrangement for processing a serial stream of randomly received digital words represented by logic "1's" and "0's" and combinations thereof to determine if each word is an exact or similar word as those previously received, said circuit arrangement comprising:
   (a) means for truncating each received word to a predetermined most significant bit (MSB) resolution by dropping at least one least significant bit (LSB) at the right end of the received word, said truncated word serving as an exact word reference;

(b) means for examining the dropped least significant bit and if it is a "1" then adding "1" to the truncated word and, conversely, if the least significant bit is a "0", then subtracting a "1" from said truncated word, said adding or subtracting forming a similar word reference;

(c) first means for receiving, holding and comparing said similar word reference against a previous similar word reference and generating a first output signal if there is a difference therebetween;

(d) second-means for receiving, holding and comparing said exact word reference against a previous exact word reference and generating a second output signal if there is a difference therebetween;

(e) circuit means for receiving said first and second output signals and generating a third output signal in the presence of either said first and second output signals; and (f) a radar receiver which receives said third output signal and outputs data in the absence of said third output signal.

4. A circuit arrangement according to claim 3, wherein said receiver operates in a multi-path blanking mode.

5. A circuit arrangement according to claim 3, wherein said receiver operates in a leading edge trigger mode.

6. A circuit arrangement according to claim 3 further comprising a time address counter that establishes the time interval in which said first and second means accomplish said comparing of said exact and similar word references respectively.

7. A circuit arrangement for processing a serial stream of randomly received words represented by logic "1's" and "0's" and combination thereof to determine if each of the words are exact or similar words to those previously received, said circuit arrangement comprising:

(a) means for truncating each of said received digital words to a predetermined most significant bit (MSB) resolution by dropping at least one least significant bit (LSB) at the right end of the received word, said truncated word serving as an exact word reference;

(b) means for examining the dropped least significant bit and if it is a logic "1", adding a logic "1" to the truncated received word and, conversely, if it is a logic "0", subtracting a logic "1" from the truncated received word, said adding or subtracting forming a similar word reference;

(c) a first serially arranged input latch and a first data selector for controlling informational flow and receiving said similar word reference, a parallel arranged first RAM "A" and first RAM "B", and a first latch "A" at the output of said first RAM "A" and a first latch "B" at the output of said first RAM "B", each of said first RAM "A" and RAM "B" having address, input and output ports and said RAM "A" also having a reset input, said first data selector connected to the address port of said first RAM "A" and to the input port of said first RAM "B", said data selector only supplying information to said first RAM "B" when the contents of said latch "A" is at a logic "0", indicating that said first RAM "A" determined that said present similar word reference had not been previously received within a predetermined time period, said reset input of said first RAM "A" connected to reset logic and the address port of said first RAM "B" connected to a clocked free-running time address counter containing a count;

(d) a second serially arranged input latch and a second data selector for controlling informational flow and receiving said exact word reference, a parallel arranged second RAM "A" and a second RAM "B", and a second latch "A" at the output of said second RAM "A" and a second latch "B" at the output of said second RAM "B", each of said second RAM "A" and RAM "B" having address, input and output ports and said second RAM "A" also having a reset input, said second data selector connected to the address port of said second RAM "A" and to the input port of said second RAM "B", said second data selector only supplying information to said second RAM "B" when the contents of said second latch "A" is at a logic "0", indicating that said second RAM "A" determined that said present exact word reference had not been previously received within a predetermined time period, said reset input of said second RAM "A" connected to reset logic and the address port of said second RAM "B" connected to a clocked free-running time address counter containing a count.

8. A circuit arrangement for processing a serial stream of randomly received digital words represented by logic "1's" and "0's" and combinations thereof to determine if each received word is an exact or similar word relative to that previously received, said method comprising the steps of:

(a) truncating each received digital word to a predetermined most significant bit (MSB) resolution by dropping at least one least significant bit (LSB) at the right end of the received word, said truncated word serving as an exact word reference;

(b) examining the dropped least significant bit (LSB) and if it is a "1" then adding "1" to the truncated word and, conversely, if it is a "0", subtracting "1" from the truncated word, said adding or subtracting forming a similar word reference;

(c) providing first circuit means for receiving, holding and comparing said similar word reference against the previously received similar word reference and generating a first output signal if there is a difference therebetween;

(d) providing second circuit means for receiving, holding and comparing said exact word reference against the previously received exact word reference and generating a second output signal if there is a difference therebetween;

(e) simultaneously applying said similar word reference and said exact word reference respectively to said first and second circuit means for receiving, holding and comparing.

9. A method according to claim 8 further comprising circuit means for receiving said first and second output signals and providing a third output signal in the presence of either said first or second output signal.

10. A method according to claim 9 further comprising the step (f) of repetitively repeating step (e).

11. A method according to claim 10, wherein said repetitive step (f) has predetermined, fixed start and stop times.

12. A method according to claim 11, wherein said repetitive step (f) has a variable predetermined interval.

13. A method according to claim 12, wherein said repetitive step (f) occurs during a preselected portion of a predetermined interval.

14. A method according to claim 13, wherein each of said digital words represents a measured RF frequency corresponding to a radar identification code and said third output signal represents that the same or similar radar identification code has been previously detected within a predetermined time interval.

15. A method of processing a serial stream of randomly received digital words each represented by logic "1's" and "0's" and combinations thereof to determine if each received word is an exact or similar word relative to that previously received, each of said digital words being representative of a measured RF frequency corresponding to a radar code, said method comprising the steps of:

(a) truncating each received digital word to a predetermined most significant bit (MSB) resolution by dropping at least one least significant bit (LSB) at the right end of the received word, said truncated word serving as an exact word reference;

(b) examining the dropped least significant bit (LSB) and if it is a "1", adding a "1" to the truncated received digital word and, conversely, if it is a "0", subtracting "1" from the truncated word, said adding or sub, racking forming a similar word reference;

(c) providing first means for receiving, holding and comparing said similar word reference against the previously received similar word reference and generating a first output signal if there is a difference therebetween;

(d) providing second means for receiving, holding and comparing said exact word reference against the previously received exact word reference and generating a second output signal if there is a difference therebetween;

(e) simultaneously applying said similar word reference and said exact word reference respectively to said first and second means for receiving, holding and comparing, said simultaneous application being repetitively repeated and in a manner selected from one of the following three procedures: (1) said repetitive step having predetermined, fixed start and stop times; (2) said repetitive step having a variable predetermined interval; and (3) said repetitive step occurring during a preselected portion of a predetermined interval;

(f) providing circuit means for receiving said first and second output signals and providing a third output signal in the presence of either said first or second output signal, said third output signal being representative that the same or similar radar identification code has been previously detected within a predetermined time interval;

(g) providing a radar receiver which outputs data in the absence of said third output signal.

16. A method according to claim 15, wherein said radar receiver operates in a multi-path blanking mode.

17. A method of processing a serial stream of randomly received digital words each represented by logic "1's" and "0's" and combinations thereof to determine if each received word is an exact or similar word relative to that previously received, each of said digital words being representative of a measured RF frequency corresponding to a radar code, said method comprising the steps of:

(a) truncating each received digital word predetermined most significant bit (MSB) resolution by dropping at least one least significant bit (LSB) at the right end of the received word, said truncated word serving as an exact word reference;

(b) examining the dropped least significant bit (LSB) and if it is a "1", adding a "1" to the truncated received digital word and, conversely, if it is a "0", subtracting "1" from the truncated word, said adding or subtracting forming a similar word reference;

(c) providing first means for receiving, holding and comparing said similar word reference against the previously received similar word reference and generating a first output signal if there is a difference therebetween;

(d) providing second means for receiving, holding and comparing said exact word reference against the previously received exact word reference and generating a second output signal if there is a difference therebetween;

(e) simultaneously applying said similar word reference and said exact word reference respectively to said first and second means for receiving, holding and comparing, said simultaneous application being repetitively repeated and in a manner selected from one of the following three procedures: (1) said repetitive step having predetermined, fixed start and stop times; (2) said repetitive step having a variable predetermined interval; and (3) said repetitive step occurring during a preselected portion of a predetermined interval;

(f) providing circuit means for receiving said first and second output signals and providing a third output signal in the presence of either said first or second output signal, said third output signal being representative that the same or similar radar identification code has been previously detected within a predetermined time interval; and (g) providing a radar receiver operating in a leading edge trigger mode and which outputs data in the absence of said third output signal.

18. A method according to claim 17 wherein said step (g) is repeated on a periodic basis having a duration of about 100 microseconds.

19. A method of processing a serial stream of randomly occurring received digital words represented by logic "1's" and "0's" and combination thereof to determine if each of the words is an exact or similar word that had been previously received, said method comprising the steps of:

(a) truncating each received digital word to a predetermined most significant bit (MSB) resolution by dropping at least one least significant bit (LSB) at the right end of the received word, said truncated word serving as an exact word reference;

(b) examining the dropped least significant bit (LSB) and if it is a "1", adding "1" to the truncated received digital word and conversely, if it is a "0", subtracting "1" from the truncated word, said adding or subtracting forming a similar word reference;

(c) providing a first serially arranged input latch and a first data selector for controlling informational flow, a parallel arranged first RAM "A" and a first RAM "B", and a first latch "A" at the output of said first RAM "A" and a first latch "B" at the output of said first RAM "B", each of said first RAM "A" and RAM "B" having address, input, and output ports and said RAM "A" also having a reset input, said first RAM "A" having a prestored routine addressable by way of its address port and that indicates the contents of the previous similar word reference and determines if the previous similar word reference is identical to the present similar word reference and if not identical provides a logic "0" to qualify said first latch "A";

(d) connecting the output of said first data selector to the address port said first RAM "A" and to the input port of said first RAM "B", and connecting the output of each of said first latch "A" and said first latch "B" to the input of said first data selector;

(e) connecting the reset input of said first RAM "A" to reset logic and the address port of said first RAM "B" to a clocked, free-running timer address counter containing a count;

(f) providing a second serially arranged input latch and a second data selector for controlling informational flow, a parallel arranged second RAM "A" and second RAM "B", a second latch "B" at the output of said second RAM "A" and a second latch "B" at the output of second RAM "B", each of said second RAM "A" and RAM "B" having address, input, and output ports and said second RAM "A" also having a reset input, said second RAM "A" having a prestored routine addressable by way of its address port and that indicates the contents of the previous exact word reference and determines if the previous exact word reference is identical to the present exact word reference and if not identical, provides a logic "0" to qualify said second latch "A";

(g) connecting the output of said second data selector to the address port of said second RAM "A" and to the input port of said second RAM "B", and connecting the output of each of said second latch "A" and said second latch "B" to the input of said second data selector;

(h) connecting the reset input of said second "RAM A" to said reset logic and the address port of said second RAM "B" to said clocked, free-running time address counter containing said count;

(i) clearing the contents of said first and second RAM "A's";

(j) simultaneously applying a similar word reference to said first serially arranged input latch and said exact word reference to said second serially arranged input latch which, in turn, respectively causes said first and second data selectors to apply said similar reference and said exact word reference to the address port of said first and second RAM "A's", each of which first and second RAM "A's" provide a logic "0" if the previous similar word reference and exact word reference, respectively, is different than said present similar word reference and exact word reference, which, in turn, respectively causes said first and second latches "A's" to have said first and second data selectors apply said similar word reference and said exact word reference to the input port of said first and second RAM "B's" which, in turn, respectively causes said first and second RAM "B's" to apply said similar word reference and said exact word reference to the said first and second latch "B's" which in turn causes said first and second RAM "B's" to apply their contents to said first and second data selectors.;

(k) simultaneously applying the count from said clocked, free-running time address counter to the address port of both said first and second RAM "B";

(l) allowing the free-running time address counter to count for one complete cycle causing the contents of the first and second latch "B's" to be applied to said first and second data selectors;

(m) repeating steps (j), (k), and (l).

* * * * *